United States Patent
Adams et al.

[11] Patent Number: 5,326,474
[45] Date of Patent: Jul. 5, 1994

[54] LOW FLOW FLUID SEPARATOR

[75] Inventors: Michael K. Adams, Manassas, Va.; Thomas H. Hane, Annapolis, Md.

[73] Assignee: The United States of America as represented by the Secretary of the Navy, Washington, D.C.

[21] Appl. No.: 976,033

[22] Filed: Nov. 13, 1992

[51] Int. Cl.$^5$ .................................. C02F 1/40
[52] U.S. Cl. ................... 210/519; 210/521; 210/522; 210/540
[58] Field of Search ............ 210/519, 521, 522, 532.1, 210/537, 538, 540, 801, 802

[56] References Cited

U.S. PATENT DOCUMENTS

| | | | |
|---|---|---|---|
| 1,407,936 | 2/1922 | Crosby | 210/538 |
| 2,497,392 | 2/1950 | Breukel | 210/521 |
| 2,728,457 | 12/1955 | Clarke | 210/521 |
| 3,426,904 | 2/1969 | Katsuta et al. | 210/522 |
| 3,529,728 | 9/1970 | Middelbeek et al. | 210/522 |
| 3,762,548 | 10/1973 | McCabe | 210/522 |
| 3,814,262 | 6/1974 | Nolley, Jr. | 210/519 |
| 3,849,311 | 11/1974 | Jakubek | 210/540 |
| 4,132,651 | 1/1979 | deJong | 210/522 |
| 4,357,244 | 11/1982 | Bose | 210/801 |
| 4,980,070 | 12/1990 | Libermann | 210/522 |

FOREIGN PATENT DOCUMENTS 555806  7/1932  Fed. Rep. of Germany .

Primary Examiner—Christopher Upton
Attorney, Agent, or Firm—Charles D. Miller

[57] ABSTRACT

A separator for immiscible fluids and particulate matter of differing densities provides a plurality of stages of fluid flow velocity reduction by change of cross-sectional areas between a plurality of flow regions (e.g. conduits and chambers) and separates a fraction of the introduced fluid or suspended particulate matter at each change of velocity whereby flow velocity may be reduced to a degree greater than accounted for by the change of cross-sectional area from stage to stage when significant amounts of materials to be separated are present in the input fluid. Further, a substantial effective length is provided, relative to the footprint of the separator. This length and gradual slowing of the fluids therein provides generally laminar flow and low turbulence. By doing so, overall volume of the passive separator is reduced and separation efficiency is substantially improved.

11 Claims, 1 Drawing Sheet

LOW FLOW FLUID SEPARATOR

BACKGROUND OF THE INVENTION

1. Field of the Invention

The present invention generally relates to separation of fluids of different densities and, more particularly, to separators for immiscible fluids such as oil and water.

2. Description of the Prior Art

Since the earliest applications of mechanical motive power systems to water-borne vessels, particularly serious problems have existed in regard to fluids collecting in the lower portions of the hulls of such vessels. The very fact that hulls of water-borne vessels must be fluid tight makes the hulls capable of collecting and holding fluids in lower portions thereof, generally referred to as the bilge. A major portion of fluids collecting in the bilge consists of water which may derive from condensation, leakage, spray, waves breaking over portions of the hull and the like. These fluids have the effect of reducing buoyancy of the hull and must be removed periodically or continuously in order to preserve the performance and safety of the vessel. If only water collects in the bilge, it can merely be discharged overboard by bailing or pumping.

However, particularly when mechanical motive power arrangements are provided for the vessel, additional problem are encountered. Specifically, such motive power systems invariably involve the use of at least petroleum-based lubricants and usually petroleum based fuels such as gasoline and/or fuel oils, hereinafter referred to as "oil". Some release of these materials within the vessels is virtually unavoidable, causing these materials to be similarly collected within the bilge. Since petroleum-based materials are less dense than water and generally immiscible therewith, they will usually rise to the top of water collecting in the bilge and thus exposed to the ambient atmosphere. The flammability of such materials, particularly in proximity to sources of ignition presented by the motive power system (e.g. steam plants, and internal combustion engines such as ignition and diesel engines) presents a major fire hazard in addition to reducing the buoyancy of the vessel.

The presence of oil with water within the bilge also presents difficulties of disposal of the bilge fluids. Specifically, the discharge of petroleum-based material into the environment has a well-recognized deleterious effect on bodies of water since oil will tend to form a thin layer over the surface thereof which impedes gas transfer at the water surface, as well as other effects. Therefore, it is imperative that little or no oil be discharged with water from the bilge. Of several possible approaches to reduction of oil discharge, most have proven impractical. For example, merely pumping all bilge fluids to a holding tank may effectively reduce the fire hazard presented by the oils while eliminating discharge from the vessel. However, such storage does not restore buoyancy of the vessel since the fluids are retained on board and usually at a higher location within the vessel where center of gravity and vessel trim and stability will be adversely affected. Similarly, while reasonably good separation of the oil from the water may occur in the relatively undisturbed confines of the bilge, merely drawing off the water does nothing to alleviate the fire hazard presented by the oils. The varying levels of the oils inhibit the effective pick-up of oil for storage without also requiring the storage of excessive and impractical amounts of water, as well, in the holding tanks.

Accordingly, it has been the practice to provide oil/water separators aboard vessels to provide a more complete separation in the bilge. By the use of such oil-water separators, the amount of water included with the oil pumped to holding tanks can be reduced to satisfactory levels consistent with vessel performance and the amount of oil included with water to be jettisoned may be held to acceptable levels.

Unfortunately, wide variations in efficiency of separation of oil and water has been encountered in different designs of oil/water separators, hereinafter referred to by the acronym OWS, particularly as a matter of scale. When bilge fluids are pumped, a mixing action occurs and the oil, though immiscible with the water, is dispersed into fine particles or droplets. These fine droplets do not separate as easily from the water due to the relatively large surface area and reduced volume. Any further forced motion of the dispersion will also tend to maintain the dispersion and inhibit separation of the oil and water. Nevertheless, some degree of slow fluid motion is necessary to cause contact between oil droplets which then merge and more readily separate from the water. This effect can be enhanced by the provision of stacks of perforated undulating plates which tend to direct the motion of oil droplets and statistically increase the likelihood of contact between the droplets. Such plates are commercially available from several suppliers, such as General Electric Co.

While the undulating shape presents a resistance to flow of fluids between the plates, the combination of the area of plates possible within a given volume at preferred spacings, together with the degree to which the flow rate of pumped bilge fluids can be slowed during passage through a given volume of an OWS and the affinity of oil for the surface of the polypropylene material of the plates, while yielding good results in very large separators, does not provide acceptable results in separators of smaller volume required for smaller vessels. More specifically a total maximum flow rate of about four gallons per minute is considered to define a low flow separator. However, the actual velocity of fluids at various points within the separator determines the efficiency with which separation will occur. Accordingly, it can be readily understood that the fluid velocity cannot easily be kept low in separators of small total volume. As a result, smaller low flow rate separators are typically characterized by lower oil and water separation efficiencies. There also appear to be scaling effects since even if separator volume and flow rate are diminished by the same factor, reduction of efficiency is generally observed.

It should be further understood that separation of oil and water can be effectively done by mechanisms other than gravity. For example, centrifugal separators are well-known for increasing the forces tending to separate fluids of different densities. However, failure of seals, noise and safety concerns in regard to high speed rotating machinery makes centrifugal separators unsuitable for shipboard use. Further, the amount of power consumed by such mechanisms reduces the amount of power available for other shipboard uses (or, if the separator is self-powered, increases vessel weight) which often must be closely budgeted on small vessels. Therefore, for shipboard use on small vessels, passive oil and water separators are much to be preferred if separation efficiencies comparable to large passive separators can be achieved at separator weights and volumes which can be accommodated.

SUMMARY OF THE INVENTION

It is therefore an object of the present invention to provide an oil-water separator of small volume and weight which is capable of substantially complete separation of oil and water by gravity.

In order to accomplish these and other objects of the invention, a passive separator for separating at least a first fluid having a first density from a second fluid having a second density greater than said first density is provided, including a first chamber having a first predetermined cross-sectional area, a second chamber having a second predetermined cross-sectional area, a passageway connecting the first chamber and the second chamber, and a collection arrangement adjacent the passageway for collecting a first fraction of the first fluid from the passageway and a second fraction of the first fluid from the second chamber.

In accordance with another aspect of the invention, a passive separator for separating at least first and second fluids and particulate matter of different densities including a separator body divided into first and second chambers by a first baffle having an aperture communicating between said first and second chambers allowing flow of a fluid through the first and second chambers, a cross-sectional area of the second chamber being greater than a cross-sectional area of the first chamber, a conduit extending substantially across the first chamber and having a cross-sectional area smaller than the cross-sectional area of said first chamber and arranged to cause a reversal of flow direction at an end thereof, a port for removing fluid at an end of said second chamber remote from the first chamber and the aperture whereby flow is established through the conduit, the first chamber and the second chamber, in sequence, and an arrangement for collecting separated materials at an entrance of each of the first and second chambers.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
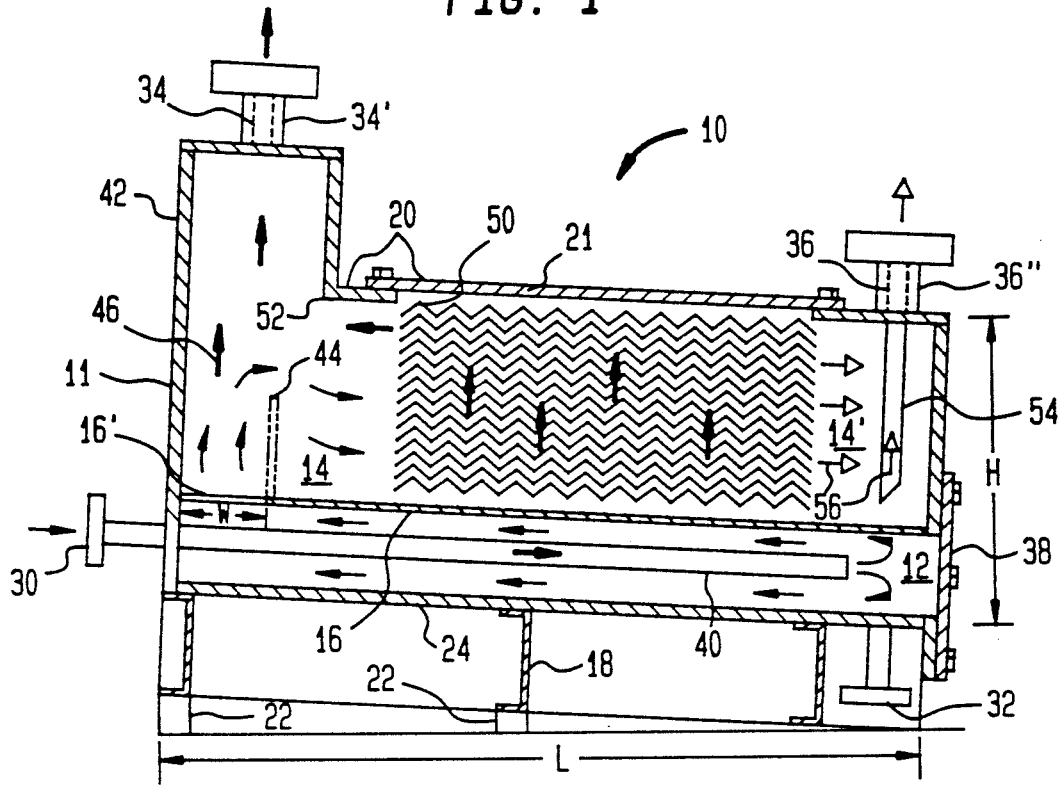
FIG. 1 is a side cross-sectional view of an oil-water separator in accordance with the invention.

Referring now to the drawings, and more particularly to FIG. 1, there is shown a cross-sectional view of the OWS 10 in accordance with the invention. The body 11 of the OWS 10 is preferably generally shaped as a rectangular prism for ease of construction, preferably from sheet stock such as metal or glass reinforced plastic which can be welded or otherwise bonded into a fluid-tight container. Alternatively the OWS body 11 can be cast from similar materials. The preferred dimensions for one embodiment of the invention designed for a bilge fluid flow rate of about one gallon per minute include a length, L, of about four feet and a height, H, of about two feet. The width is considered to be most variable of the dimensions in view of the internal flow patterns although substantial variation of H and L are also possible. A nominal width of about eighteen inches, however, corresponding to the width of commercially available plates, will accommodate the flow rate indicated above, yielding a volume of about twelve cubic feet and a footprint of only six square feet.

The body 11 is divided into two principal chambers 12 and 14, separated by a baffle 16. The ratio of volumes of these two chambers is about 5:1 in this embodiment. However, the division of the body should preferably be designed in consideration of reduction of flow velocity as will be discussed below. The body is also preferably supported by supports 18 preferably in the form of beams which will provide some stiffening for the body 11 and assist in distributing the weight of fluid contained in the OWS. Also, supports 18 should preferably be compatible with the use of shims to provide inclination of at least top surface 20 and baffle 16 by about 5 degrees. Inclination of bottom surface 24 is somewhat less important but it is considered convenient to form body 11 with baffle 16 and top surface 20 parallel to the bottom surface 24 and then to incline the entire body 11 with shims to provide a small angle, which is also not critical to the practice of the invention but may be used to adjust performance of the OWS. It may also be desirable to increase the angle of inclination of the OWS to compensate for effects of vessel motion on the operation of the OWS.

The OWS in accordance with the invention has an inlet 30 for introducing bilge fluids into the OWS and four outlet ports 32, 34, 36 and 36' for drawing off of separated materials. Specifically, port 32 and 36' (and also clean-out access plate 38) are used for removal of sludge which can include oil or water absorptive particulate matter. Port 34 is used for drawing off of separated oil to a holding tank and port 36 is used for drawing off water to be jettisoned.

Inlet 30 introduces bilge fluids into chamber 12 through a pipe or duct 12 which runs substantially the full length of chamber 12. Also, laminar flow within the pipe allows some initial contact between oil droplets and begins the separation process. This is considered preferable to merely introducing bilge fluids into chamber 12 at the lower end since the reversal of direction of flow at the end of pipe 40 within chamber 12 assists in separation of particulates from the bilge fluids. Further, this orientation of pipe 40 allows for simplification of removal of access plate 38 since no fluid connections are then required at the preferred location thereof, as shown.

As mentioned above, the cross-sectional area of chamber 12 should be about 20–40 times the cross-sectional area of pipe 40 to cause a rapid reduction in flow rate. For this reason also, the end of pipe 40 is recessed from the end of chamber 12 by a distance approximating the height of chamber 12 in order to reduced turbulence in the vicinity of separated sludge when the direction of flow is reversed and to facilitate cleaning. This reduced flow rate allows oil droplets to migrate upward toward the baffle 16 where they may more readily come in contact and coalesce with other oil droplets to form oil droplets which are more readily separated from the water by gravity and, at the same time, allows more dense particulates to settle out from the flow as sludge to increase the time between required cleaning of the OWS and separator plate stack 50. This process will continue over the length of chamber 12 to a point adjacent the location of inlet 30 where an aperture 16' is provided in baffle 16. This aperture 16' may be sized to increase flow rate slightly and increase in flow rate of 10% to 25% to establish a new direction of flow. However, it should be understood that this constriction is considered to be more an incident of the structural design of the separator 10 and no specific effect of this constriction on the separation function has been ascertained.

A baffle 44 may also be included adjacent aperture 16' which may extend over about one half the height of chamber 14 in accordance with the following theory. This extent of baffle 44 is preferred as a balance between the creation of turbulence at the entrance to chamber 14 and at the base of oil tower 42 and the direction of oil droplets toward oil tower 42 where some droplets may be directly collected. These larger droplets which have formed in chamber 12 will tend to migrate across the flow toward the end of the separator beneath the oil tower as indicated by the location of solid arrow 46 and will be collected if not directed into chamber 14 by the flow at the top of baffle 44. Therefore, the extent of baffle 44 should provide as great a length of laminar flow as possible without causing turbulence or constricting flow, causing fluid acceleration at the entrance to chamber 14 and the entrance to separator plates 50. For this reason also, the separator plates 50 are set back horizontally from baffle 44 by a distance approximately equal to the distance from the top of baffle 44 from the top surface 20 of separator body 11. It is especially important that flow rate of bilge fluids be slow at location 52 since oil droplets will be moving by their own buoyancy directly against the flow of bilge fluids at that location. Therefore, as a design rule-of-thumb in accordance with the invention, the area defined by the separator body sides, the top of baffle 44 and the junction 52 between the oil tower 42 and top surface 20 should be at least 150% of aperture 16'.

However, in regard to the inclusion of baffle 44, experience with a particular construction has resulted in somewhat improved oil and water separation when the baffle is omitted. In this case, to achieve the same objectives with regard to the flow velocity, the relationship of height of chamber 14, the width W of aperture 16' and the setback of the separator plates 50 from the near edge of aperture 16' should be such that the width W is about one-third of the height of chamber 14 and the setback of the oil separator plates 50 is approximately 2W. Nevertheless inclusion of a small portion of baffle 44 may be useful to the separation and collection of particulate matter, depending on the amount and particle sizes contained in the input fluid. Specifically, any particulate matter which is not collected in chamber 12 may be carried to chamber 14 where the reduced flow velocities may allow it to settle. Therefore, as such particulate material collects on the bottom of chamber 14, a short baffle located at the position of baffle 44 will assist in maintaining separation between settled particulate particle and regions of the separator having somewhat higher fluid flow rate (e.g. at aperture 16').

Within chamber 14, the partially separated bilge fluids are subjected to a second stage of separation which is most effective for oil droplets which remain very small due to the function of separator plates 50. Flow through the separator plates 50 is maintained by continuously drawing off water (except when the oil tower is full of separated oil, as determined by sensors which will be described below) from the bottom of the opposite end of chamber 14 through pipe 54 and port 36, as indicated by hollow arrows 56. Separator plates 50 function in a known manner by causing a serpentine flow between their undulating surfaces which causes efficient contact an coalescing of oil droplets. The droplets are captured in the downwardly concave portions of the undulations where further coalescing takes place due to the affinity between the polypropylene material of the plates and the oil until the droplets escape through perforations in the plates nd rise through the sequence of separator plates 50 to top surface 20 of separator body 11 along which they will migrate to oil tower 42 due to the inclination of top surface 20.

Oil tower 42 provides for effective and efficient capture of oil droplets which then coalesce into fluid oil having relatively low water content. The relative buoyancy of the oil, thus concentrated displaces water downwardly out of the oil tower 42 and little water is drawn off to holding tanks if the drawing off of oil is sufficiently slow to maintain an interface between the oil and water about midway of the height of the oil tower. This level is maintained through sensors mounted in ports 34' and 36", shown in FIG. 2. Well-known automatic controls for valves external to the separator 10 are controlled to stop the drawing off of water if too much oil accumulates in oil tower 34 such that oil may be conducted to port 36. By the same token, an additional sensor restrict the drawing off of oil from the oil tower if the water level rises so high that significant water would be drawn off with the oil to a holding tank. Similarly, if the water level falls to a level where oil is not supported in the oil tower, drawing off of water is interrupted until a proper water level is reestablished.

In practice, it has been found that the two stages of separation and fluid flow velocity reduction provided by the present invention, together with a relatively long flow path relative to the footprint of the separator as well as the oil separation plates 50 provide exceptionally good separation of oil and water and few, if any, oil droplets reach region 14' in the vicinity of water port 36 and pipe 54. Flow velocity is very low in this region and any oil droplets readily separate from the water by their own buoyancy and are carried to the oil tower in the same manner as the droplets emerging from separator plates 50 by inclined top surface 20. In a test of the operation of the invention over a period of 403 hours, during which approximately 24,000 gallons of bilge water was processed, 154 of 155 samples of separated water contained less than the amount of oil permitted under current standards. These same standards also specify that 95% of samples must contain less than the permitted amount of oil. Therefore, the performance of the present invention greatly exceeds current standards while being of small size and relatively low weight.

Figure 2:
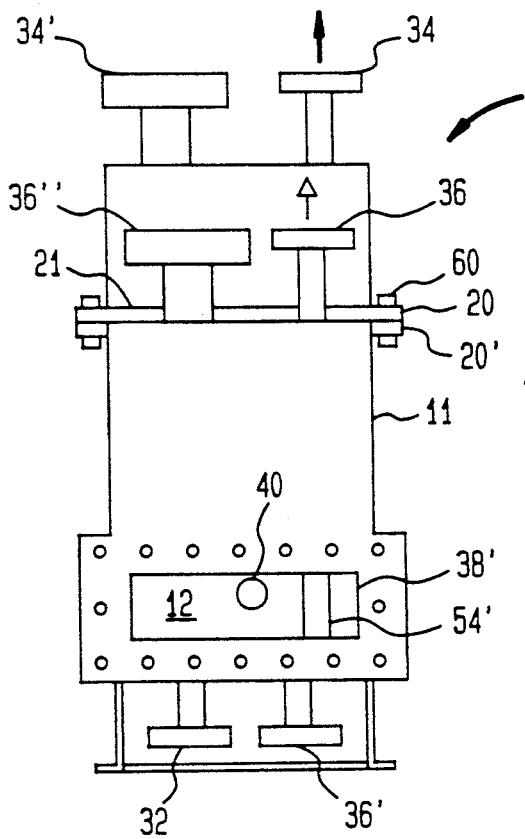
FIG. 2 is an end view (with an access panel removed) of an oil-water separator in accordance with the invention, and FIG. 3 schematically illustrates the principles of the invention.

Referring now to FIG. 2, some preferred features of the invention will now be discussed. FIG. 2 is an end view of the OWS 10 to which clean-out cover plate 38 is attached, preferably by bolts. The cover plate has been removed in this view to show that the clean-out opening 38' is essentially of the same dimensions as the internal cross-section of chamber 12, allowing efficient cleaning of OWS 10 by a simple scraping operation. Removal of cover plate 38 also provides access to the open end of pipe 40 for maintenance or replacement.

Additionally, as a perfecting feature of the invention, a further pipe 54' is provided for communication with port 36'. Port 36' may be most advantageously used in combination with sludge port 32 for draining the area around the inlet of pipe 56 for removal of any sludge which may reach chamber 14 or for draining the OWS 10 for maintenance or when the entire unit is replaced or moved. In this case, the connection illustrated should be considered as a preferred form of a drain for chamber 14. The upper end of pipe 54' should therefore be flush with the bottom of chamber 14 in the region 14'.

Additional or auxiliary water and oil ports 36", 34' are also visible in FIG. 2. If provided, as is preferred to provide internal access to the interior of the OWS for oil and for water sensor installation.

Also visible in FIG. 2 are flanges 20' for securing top surface 20, preferably by through bolting since, in operation, this joint will be under hydrostatic pressure due to the oil tower 42. Flanges 20' also provide for the installation and removal of separator plates 50 which should extend to and contact the sides of OWS body 11 in order to function efficiently. It will be noted from FIG. 1 that the access plate 21 covers an opening sized for installation and removal of the separator plate stack. This access also allows for mechanical cleaning and maintenance of chamber 14 when the OWS is not in operation.

Figure 3:
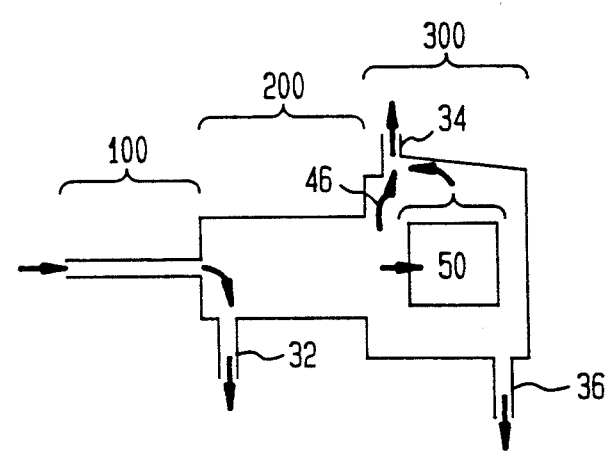

While the increased efficiency of the low flow rate OWS in accordance with the invention is not considered to be fully understood, other than for the relatively long path through which velocity is gradually reduced and which encourages generally laminar flow with little turbulence, it is believed that the two-stage reduction of flow velocity between stages 100/200 and 200/300 of FIG. 3 maintains more nearly optimal flow velocities of bilge fluids through the separator plates while achieving some desired separation at each velocity change. Although bilge water will typically contain only about 100 parts per million of oil, if significant amounts of materials separable from water are present, this flow velocity may be further reduced by the prior separation of a portion of the oil, indicated by arrow 46 in FIGS. 1 and 3. Collection of separated materials is also believed to be enhanced by the control of flow direction at each point of flow velocity change.

In practice, the invention as described above provides a degree of oil removal from water which exceeds performance of other, larger, separators of other designs and similar flow rates and which exceeds present oil discharge requirements with a separator of much reduced size weight and footprint. This degree of oil removal from dischargeable water has not heretofore been obtained with a passive OWS of such small volume. It is also to be expected that the principles of the present invention will produce improved performance in larger scale OWS systems when incorporated therein.

While the invention has been described in terms of a single preferred embodiment, those skilled in the art will recognize that the invention can be practiced with modification within the spirit and scope of the appended claims.

Having thus described my invention, what is claimed as new and desired to be secured by Letters Patent is as follows:

1. A passive separator for separating at least a first fluid having a first density from a second fluid having a second density greater than said first density including
   a first chamber having a first predetermined cross-sectional area,
   a second chamber having a second predetermined cross-sectional area,
   a conduit extending through said first chamber from a fluid inlet on a first side of said chamber and terminating near a second side of said first chamber;
   said second chamber being located on top of said first chamber;
   said first chamber having an opening on an upper side thru which fluids may flow upward into an enclosed passageway and into said second chamber said passageway connecting said first chamber and said second chamber, and
   means atop said passageway for collecting a first fraction of said first fluid from said passageway and a second fraction of said first fluid from said second chamber.

2. A passage separator as recited in claim 1, wherein a cross-sectional area of said fist chamber is in the range of 20–40 times larger than a cross-sectional area of said conduit.

3. A passive separator as recited in claim 2, wherein a separation of an end of said conduit from said opposite end of said first chamber is approximately the same as one transverse dimension of said cross-sectional area of said first chamber.

4. A passive separator as recited in claim 3, further including a baffle adjacent said passageway and positioned to direct fluid toward said means for collecting said first fluid.

5. A passive separator as recited in claim 1, wherein said second cross-sectional area of said second chamber is larger than said first cross-sectional area of said first chamber.

6. A passive separator as recited in claim 5, wherein said second cross-sectional area is approximately five times larger than said first cross-sectional area.

7. A passive separator as recited in claim 1, further including at least one fluid separator plate in said second chamber.

8. A passive separator as recited in claim 1, further including a fluid separator plate stack in said second chamber.

9. A passive separator as recited in claim 1, further including means for collecting particulate matter adjacent said end of said conduit.

10. A passive separator as in claim 1 wherein the said passageway is above the said first chamber.

11. A passive separator for separating at least a first fluid having a first density from a second fluid having a second density greater than said first density comprising:
    a first chamber;
    a second chamber;
    a conduit extending through said first chamber from a fluid inlet on a first side of said chamber and terminating near a second side of said first chamber;
    said second chamber being located on top of said first chamber;
    said first chamber having an opening on an upper side thru which fluids may flow upward into an enclosed passageway and into said second chamber;
    an outlet atop of said enclosed passageway for collecting a first fraction of said first fluid from said enclosed passageway and a second fraction of said first fluid from said second chamber;

said second chamber including a stack of fluid separator plates;
the said upper side of said first chamber being substantially flat and being inclined slightly to horizontal and a substantially flat upper side of said second chamber being slightly inclined to horizontal to facilitate the flow of said first fluid to said outlet, from said first chamber and from said stack plates in said second chamber.

* * * * *